(12) United States Patent
Derscheid et al.

(10) Patent No.: US 12,439,858 B2
(45) Date of Patent: Oct. 14, 2025

(54) ROUND BALER IMPLEMENT WITH NET SCRAPER (71) Applicant: DEERE & COMPANY, Moline, IL (US)

(72) Inventors: Daniel E. Derscheid, Ottumwa, IA (US); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 458 days.

(21) Appl. No.: 18/297,668

(22) Filed: Apr. 10, 2023

(65) Prior Publication Data
US 2024/0334880 A1 Oct. 10, 2024

(51) Int. Cl.
*A01F 15/07* (2006.01)
(52) U.S. Cl.
CPC ................ *A01F 15/0715* (2013.01)
(58) Field of Classification Search
CPC .................................................. A01F 15/0715
See application file for complete search history.

(56) References Cited

U.S. PATENT DOCUMENTS

| | | | |
|---|---|---|---|
| 4,581,879 A | 4/1986 | Anstey | |
| 5,216,873 A * | 6/1993 | Ratzlaff | B65B 11/04 53/118 |
| 5,319,899 A * | 6/1994 | Jennings | A01F 15/0715 53/118 |
| 5,448,873 A * | 9/1995 | Jennings | A01F 15/0715 53/118 |
| 5,557,906 A | 9/1996 | Viaud | |
| 9,010,071 B2 | 4/2015 | Claeys et al. | |
| 2016/0183473 A1 * | 6/2016 | Horst | A01F 25/14 53/588 |
| 2019/0014725 A1 | 1/2019 | Gresset et al. | |

FOREIGN PATENT DOCUMENTS

| | | | |
|---|---|---|---|
| EP | 4151076 A1 | 3/2023 | |
| FR | 2775157 B1 | 4/2000 | |
| RU | 2167510 C2 * | 5/2001 | ........... A01F 15/106 |
| WO | WO-2016140569 A1 * | 9/2016 | ......... A01F 15/0715 |

OTHER PUBLICATIONS

English Translation of RU-2167510-C2 (Year: 2001).*
Extended European Search Report and Written Opinion issued in European Patent Application No. 24162533.4 dated May 24, 2024, in 07 pages.

* cited by examiner

*Primary Examiner* — Claude J Brown (57) ABSTRACT

A baler implement includes a wrap system having a first spool roller and a second spool roller arranged in parallel and positioned to form a nip therebetween. The first and second spool rollers are configured to receive a wrap material through the nip and discharge the wrap material from the nip toward an inlet of a baling chamber. A scraper is positioned on the outlet side of the nip adjacent to the first spool roller for guiding the wrap material away from a circumferential exterior surface of the first spool roller to prevent the wrap material from wrapping around the first spool roller. The scraper includes an undulating edge defining a plurality of peaks and a plurality of valleys with the plurality of peaks positioned proximate to the circumferential exterior surface of the first spool roller.

20 Claims, 5 Drawing Sheets

ROUND BALER IMPLEMENT WITH NET SCRAPER

TECHNICAL FIELD

The disclosure generally relates to a round baler implement and a wrap system of the round baler implement.

BACKGROUND

Round balers are typically equipped with a wrap system for wrapping a bale with a wrap material secure the bale in a cylindrical shape for storage and transport. The wrap material may include, but is not limited to, a net material or a solid sheet material. Some wrap systems are configured with a pair of spool rollers that are positioned to form a nip therebetween, and which inject the wrap material through an inlet and into a baling chamber. The wrap material is a very flexible material and can be difficult to control, especially when starting the wrapping cycle in which a leading edge of the wrap material must be inserted through the inlet and into the baling chamber.

One challenge with these types of systems is the lack of control of the wrap trajectory as the wrap material is ejected from the nip between the pair of spool rollers. There are many variables that can cause undesirable trajectories on the wrap material and result in the wrap material not aligning with the inlet and being blocked from the entering the baling chamber and/or wrapping around one of the spool rollers.

SUMMARY

A baler implement is provided. The baler implement includes a baling system defining a baling chamber having an inlet into the baling chamber. The baling system is operable to receive crop material into the baling chamber through the inlet and form the crop material into a bale within the baling chamber. A wrap system is operable to insert a wrap material through the inlet and into the baling chamber to wrap the bale. The wrap system includes a first spool roller and a second spool roller arranged in parallel and positioned to form a nip therebetween. The first spool roller and the second spool roller are configured to receive the wrap material from a supply roll through an entrance side of the nip and discharge the wrap material toward the inlet of the baling chamber through an outlet side of the nip. A scraper is positioned on the outlet side of the nip adjacent to the first spool roller for guiding the wrap material away from a circumferential exterior surface of the first spool roller to prevent the wrap material from wrapping around the first spool roller. The scraper includes an undulating edge defining a plurality of peaks and a plurality of valleys with the plurality of peaks positioned proximate to the circumferential exterior surface of the first spool roller.

In one aspect of the disclosure, the scraper includes a panel extending parallel with the first spool roller. The panel includes and/or defines the undulating edge of the scraper. The panel may be arranged to present the plurality of peaks of the undulating edge in a generally tangential relationship relative to the circumferential exterior surface of the first spool roller. The panel may further be arranged to position the plurality of peaks of the undulating edge a separation distance from a tangent line passing through the nip between the first spool roller and the second spool roller. In one implementation, the separation distance is equal to or greater than five millimeters (5 mm). In one particular implementation, the separation distance may be approximately equal to fifteen millimeters (15 mm). However, it should be appreciated that the separation distance may vary from the example implementation described herein.

In one aspect of the disclosure, the panel may be arranged to position the plurality of peaks of the undulating edge a first orthogonal distance from the circumferential exterior surface of the first spool roller. The panel may further be arranged to position the plurality of valleys of the undulating edge a second orthogonal distance from the circumferential exterior surface of the first spool roller. The first orthogonal distance is less than the second orthogonal distance.

In one aspect of the disclosure, the panel may include and/or be manufactured from a resilient material capable of bending and returning to an initial shape and/or form. For example, the resilient material may include, but is not limited to a metal such as but not limited to a steel material or a spring steel material, or a plastic/polymer material exhibiting resilient properties.

In one aspect of the disclosure, the plurality of peaks and the plurality of valleys of the undulating edge are arranged in an alternating sequence in which each one of the plurality of valleys is disposed between a respective pair of adjacent peaks of the plurality of peaks. Each respective pair of the adjacent peaks defines a peak-to-peak distance therebetween. The peak-to-peak distance may include a value that is between the range of five millimeters (5 mm) and two hundred millimeters (200 mm), and more particularly between the range of ten millimeters (10 mm) and one hundred millimeters (100 mm). However, it should be appreciated that the peak-to-peak distance may vary from the example implementation described herein.

In one aspect of the disclosure, the undulating edge includes an edge length that is equal to or greater than one half a roller length of the first spool roller. The edge length and the roller length may be measured along a respective axis of rotation of the first spool roller. In one implementation, the edge length of the undulating edge is substantially equal to the roller length of the first spool roller.

In one aspect of the disclosure, the first spool roller includes an elastic material forming the exterior circumferential surface thereof. The elastic material may include, but is not limited to, a rubber material or a rubber-like material.

In one aspect of the disclosure, the first spool roller and the second spool roller are configured to rotate about respective axes of rotation in opposite rotational directions relative to each other.

In one aspect of the disclosure, the undulating edge defines a finger depth. The finger depth is measured perpendicularly relative to and between an apex of a respective one of the plurality of peaks and a root of a respective adjacent one of the plurality of valleys. In one implementation, the finger depth is equal to or greater than three millimeters.

Accordingly, the undulating edge of the scraper is positioned and shaped to separate the wrap material from the first spool roller and direct the wrap material toward the inlet into the baling chamber in the event the wrap material remains stuck to the first spool roller and does not properly eject out of the nip. If the wrap material includes a mesh net wrap material, the plurality of peaks may grasp or hook the mesh net wrap material to prevent the wrap material from wrapping around the first spool roller, until adjacent portions of the wrap material may draw the wrap material into the baling chamber and thereby remove the wrap material from the grasp of the plurality of peaks.

The above features and advantages and other features and advantages of the present teachings are readily apparent

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
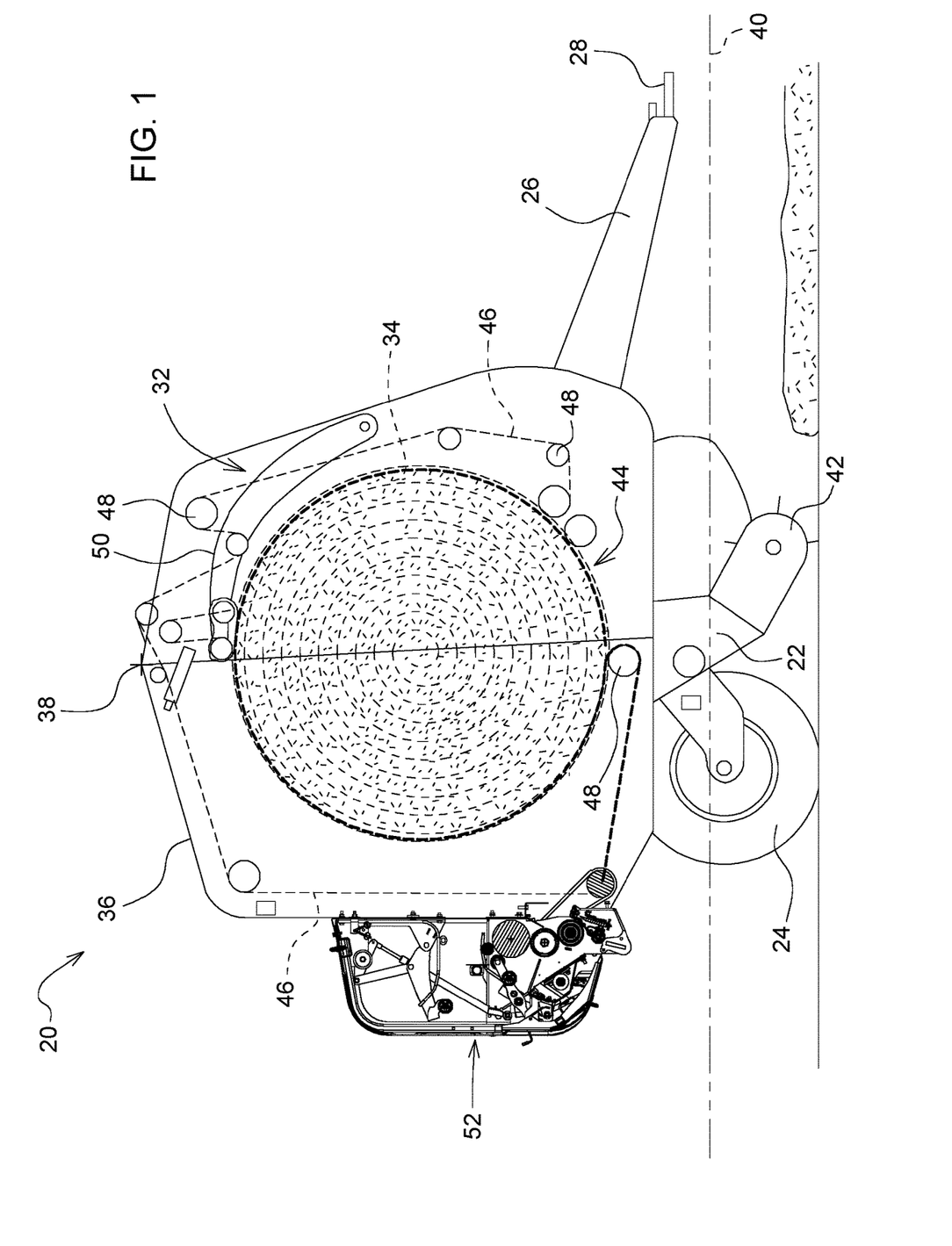
FIG. 1 is a schematic side view of a round baler implement.

Referring to the Figures, wherein like numerals indicate like parts throughout the several views, a baler implement is generally shown at 20. Referring to FIG. 1, the baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement 28 may be included with the tongue 26. The hitch arrangement 28 may be used to attach the baler implement 20 to a traction unit, such as but not limited to an agricultural tractor. In other embodiments, the baler implement 20 may be self-propelled, in which case the traction unit and the baler implement 20 are configured as a single, self-propelled vehicle.

The baler implement 20 includes a baling system 32. The baling system 32 forms a baling chamber 34. The baling system 32 is attached to and supported by the frame 22. The baling system 32 may include one or more walls or panel 88s that at least partially enclose and/or define the baling chamber 34. In the example implementation shown in the Figures and described herein, the baler implement 20 further includes a gate 36. The gate 36 is attached to and rotatably supported by the frame 22. The gate 36 is positioned adjacent a rearward end of the frame 22 and is pivotably moveable about a gate axis 38. The gate axis 38 is generally horizontal and perpendicular to a central longitudinal axis 40 of the frame 22. The gate 36 is moveable between a closed position for forming a bale within the baling chamber 34, and an open position for discharging the bale from the baling chamber 34.

The baler implement 20 includes a pick-up 42 disposed proximate the forward end of the frame 22. The pickup gathers crop material from a ground surface and directs the gathered crop material toward and into an inlet 44 of the baling chamber 34. The pickup may include, but is not limited to tines, forks, augers, conveyors, baffles, etc., for gathering and moving the crop material. The baler implement 20 may be equipped with a pre-cutter, disposed between the pickup and the inlet 44. As such, the pre-cutter is disposed downstream of the pickup and upstream of the inlet 44 relative to a direction of travel of the crop material. The pre-cutter cuts or chops the crop material into smaller pieces.

The baler implement 20 may be configured as a variable chamber baler, or as a fixed chamber baler. The example implementation of the baler implement 20 shown in the Figures and described herein is depicted and described as a variable chamber baler. As is understood by those skilled in the art, the variable chamber baler includes a plurality of longitudinally extending side-by-side forming belts 46 that are supported by a plurality of rollers 48. The bale is formed by the forming belts 46 and one or more side walls of the housing.

The crop material is directed through the inlet 44 and into the baling chamber 34, whereby the forming belts 46 roll the crop material in a spiral fashion into the bale having a cylindrical shape. The forming belts 46 apply a constant pressure to the crop material as the crop material is formed into the bale. A forming belt tensioner 50 continuously moves the forming belts 46 radially outward relative to a center of the cylindrical bale as the diameter of the bale increases. The forming belt tensioner 50 maintains the appropriate tension in the forming belts 46 to obtain the desired density of the crop material.

Figure 2:
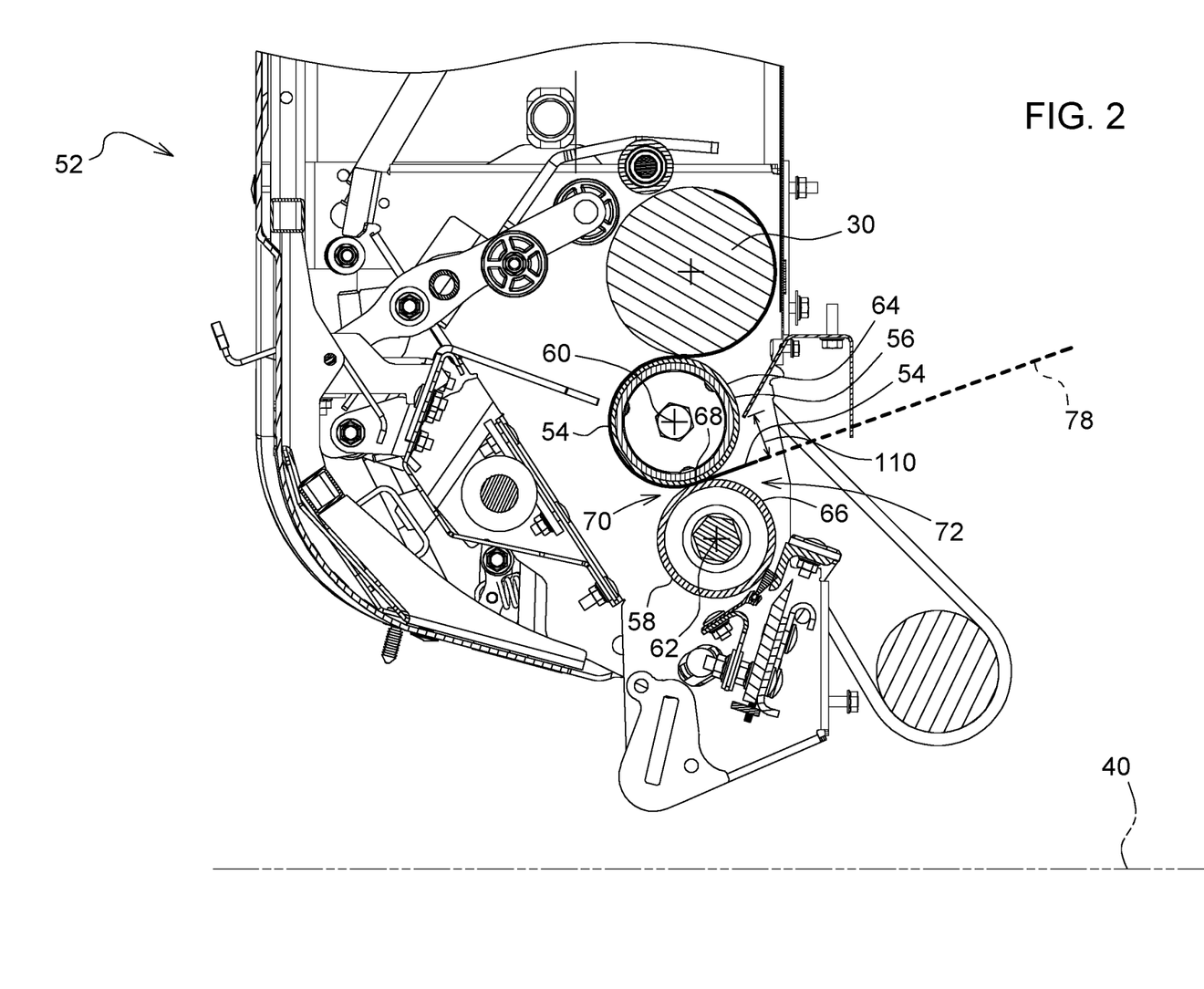
FIG. 2 is a schematic cross sectional partial side view of a wrap system of the round baler implement.
Figure 3:
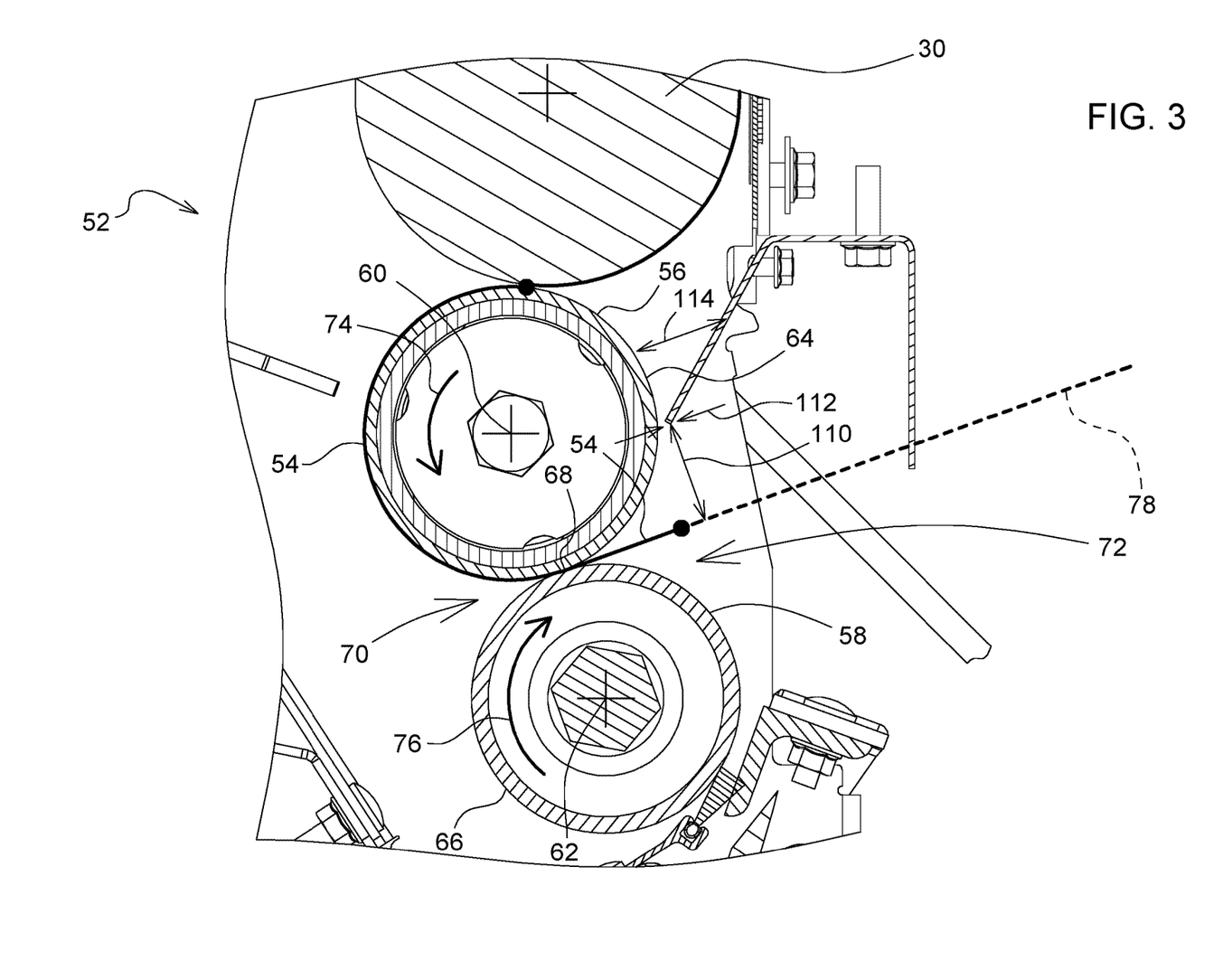
FIG. 3 is a schematic and enlarged cross sectional partial side view of the wrap system showing an ejection trajectory of a wrap material.
Figure 4:
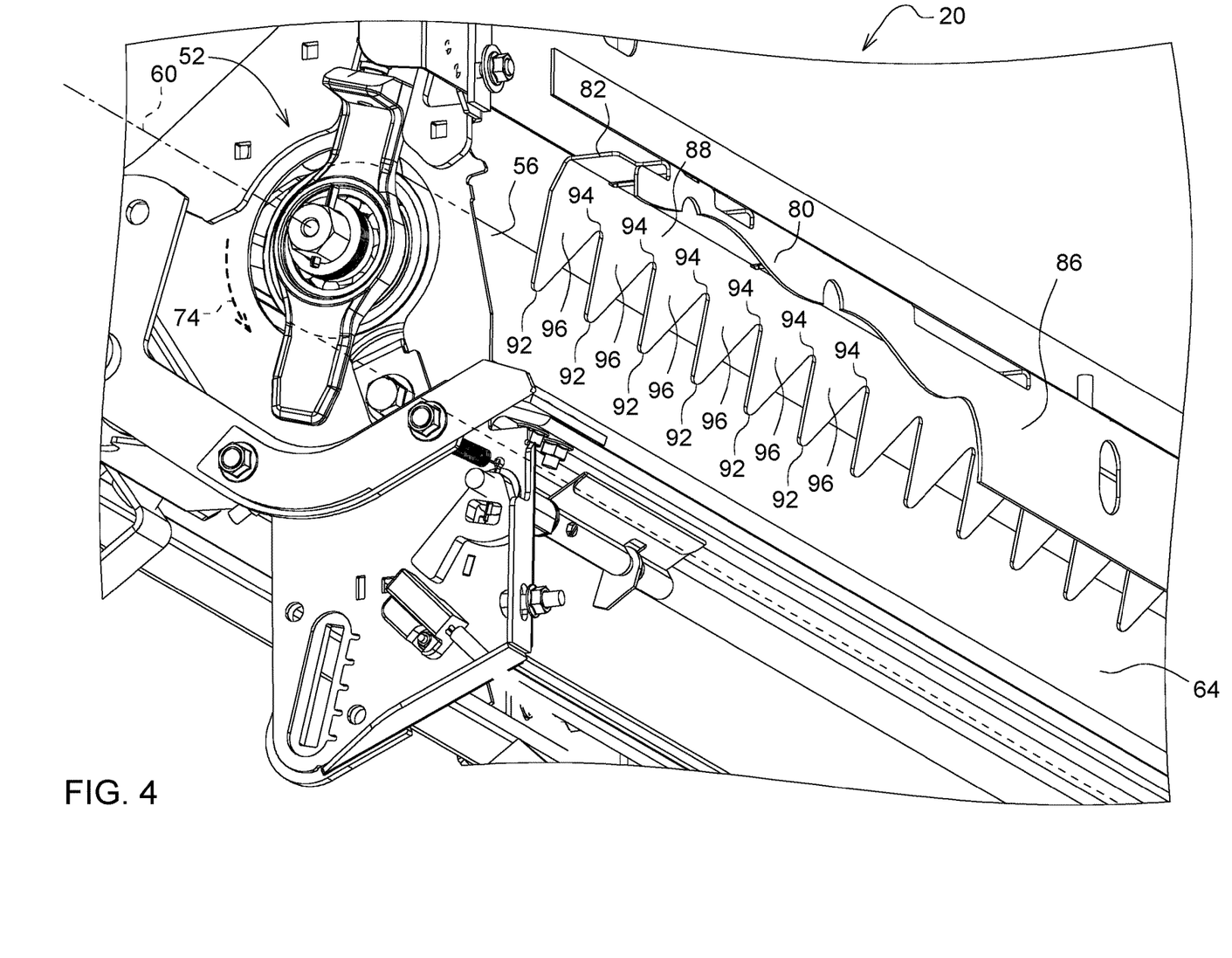
FIG. 4 is a schematic and enlarged perspective view of the wrap system.
Figure 5:
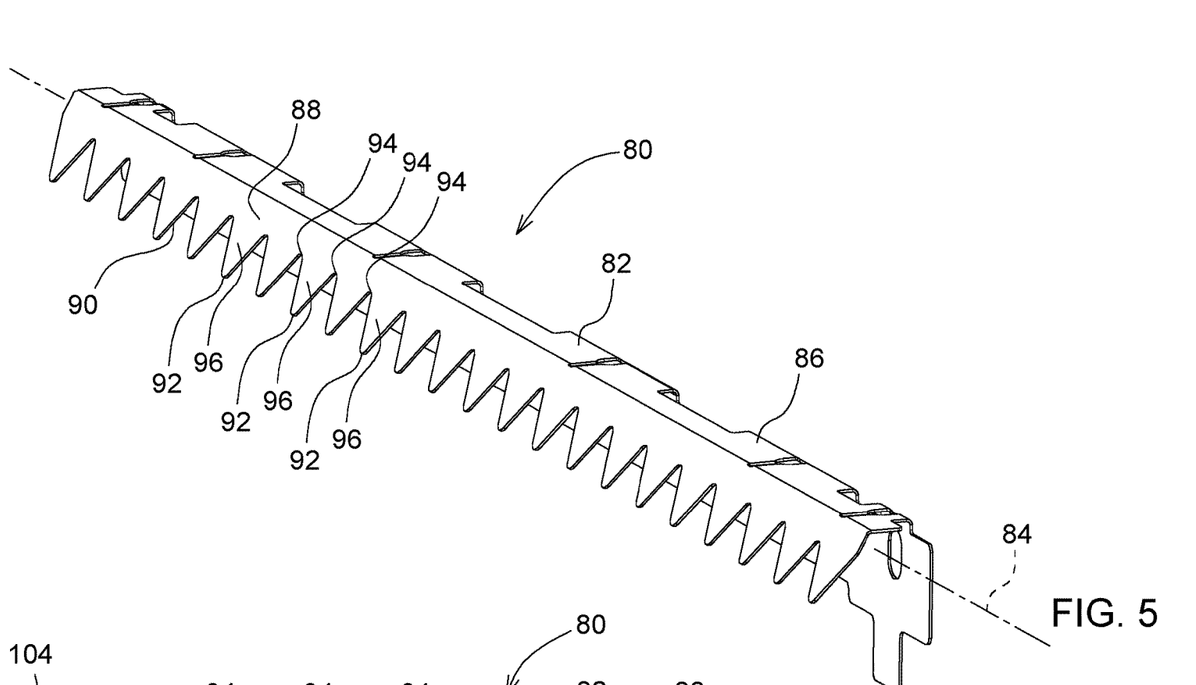
FIG. 5 is a schematic perspective view of a scraper of the wrap system.

The baler implement 20 includes a wrap system 52. The wrap system 52 is operable to wrap the bale with a wrap material 54 inside the baling chamber 34. Once the bale is formed to a desired size, the wrap system 52 is initiated to begin a wrap cycle. Referring to FIGS. 2-3, when a wrap cycle is initiated the wrap system 52 feeds or inserts the wrap material 54 through the inlet 44 and into the baling chamber 34 to wrap the bale and thereby secure the crop material in a tight package and maintain the desired shape of the bale. The wrap material 54 may include, but is not limited to, a net mesh or a solid plastic wrap. Movement of the gate 36 into the open position simultaneously moves the forming belts 46 clear of the formed bale and allows the formed and wrapped bale to be discharged through the rear of the baling chamber 34.

Referring to FIGS. 2-3, the wrap system 52 includes a pair of spool rollers 56, 58. The pair of spool rollers 56, 58 includes a first spool roller 56 and a second spool roller 58. The first spool roller 56 and the second spool roller 58 are arranged in a parallel relationship, and extend transversely across a width of the frame 22 in a horizontal orientation, generally perpendicular to the central longitudinal axis 40 of the frame 22.

The first spool roller 56 includes a cylindrical shape having a respective centerline, about which the first spool roller 56 rotates. As such, the respective centerline of the first spool roller 56 is an axis of rotation 60 of the first spool roller 56. The second spool roller 58 includes a cylindrical shape having a respective centerline, about which the second spool roller 58 rotates. As such, the respective centerline of the second spool roller 58 is an axis of rotation 62 of the second spool roller 58. The first spool roller 56 and the second spool roller 58 are arranged such that an exterior circumferential surface 64 of the first spool roller 56 and an exterior circumferential surface 66 of the second spool roller 58 are disposed in contacting or abutting engagement, and form a nip 68 therebetween where their respective exterior circumferential surfaces 64, 66 come together and meet. As used herein, the term "nip 68" may be defined as, but is not limited to, the region where the first spool roller 56 and the second spool roller 58 come together and contact each other.

As described above, the pair of spool rollers 56, 58 are configured to rotate about their respective axes of rotation. The first spool roller 56 and the second spool roller 58 rotate in opposite rotational directions relative to each other and receive the wrap material 54 from a supply roll 30 through an entrance side 70 of the nip 68 and discharge the wrap material 54 toward the inlet 44 of the baling chamber 34 through an outlet side 72 of the nip 68. As shown in the example implementation of the Figures, the first spool roller 56 is rotatable about its' respective axis of rotation 60 in a counter-clockwise direction 74 as viewed on the page of the drawing, and the second spool roller 58 is rotatable about its' respective axis of rotation 62 in a clockwise direction 76 as viewed on the page of the drawing. As such, the first spool roller 56 and the second spool roller 58 cooperate to feed the wrap material 54 through the nip 68, from left (entrance side 70 of the nip 68) to right (outlet side 72 of the nip 68) as viewed on the page of the drawing.

The first spool roller 56 may include an elastomer defining the exterior circumferential surface 64 of the first spool roller 56. The elastomer exhibits static adhesion or "sticky" properties which limits movement of the wrap material 54 relative to the exterior circumferential surface 64 of the first spool roller 56. The elastomer may include for example, but is not limited to, a natural or synthetic rubber material, a rubber-like material, or some other material having similar static adhesion properties.

The second spool roller 58 may also include an elastomer defining the exterior circumferential surface 66 of the second spool roller 58. The elastomer exhibits static adhesion or "sticky" properties which limits movement of the wrap material 54 relative to the exterior circumferential surface 66 of the second spool roller 58. The elastomer may include for example, but is not limited to, a natural or synthetic rubber material, a rubber-like material, or some other material having similar static adhesion properties.

As shown in FIGS. 2-3, the wrap material 54 follows a routing path that partially encircles the first spool roller 56 about the axis of rotation 60 of the first spool roller 56. The routing path follows a counter-clockwise path around the exterior circumferential surface 64 of the first spool roller 56 as viewed on the page of the drawing. The wrap material 54 enters the nip 68 moving from left to right as viewed on the page of the drawing, whereby the wrap material 54 is grasped between the first spool roller 56 and the second spool roller 58 at the nip 68. During a wrap cycle, the first spool roller 56 and the second spool roller 58 are counter rotated bout their respective axes of rotation to eject the wrap material 54 from the nip 68 toward and through the inlet 44 and into the baling chamber 34.

An ejection trajectory is the trajectory or path that a leading edge of the wrap material 54 follows when ejected from the nip 68 and prior to entering or passing through the inlet 44 into the baling chamber 34. The ejection trajectory may be described relative to a tangent line 78 of the nip 68. As described above, the nip 68 is the contact location where the exterior circumferential surface 64 of the first spool roller 56 contacts the exterior circumferential surface 66 of the second spool roller 58. The tangent line 78 of the nip 68 is therefore the tangent of a contact point between the exterior circumferential surface 64 of the first spool roller 56 and the exterior circumferential surface 66 of the second spool roller 58 at the nip 68, and generally extends along the central longitudinal axis 40 of the frame 22. Wrap material 54 discharged from the nip 68 within an allowable angular range above and below the tangent line 78 of the nip 68 should properly enter the inlet 44 of the baling chamber 34. However, occasionally, the wrap material 54 may fail to separate from the first spool roller 56 and/or separate from the first spool roller 56 outside of the allowable angular range.

In order to prevent the wrap material 54 from being wrapped completely around the first spool roller 56 and to help guide the wrap material 54 into the inlet 44 when the wrap material 54 fails to separate from the first spool roller 56 within the allowable angular range of the tangent line 78 of the nip 68, the baler implement 20 may include a scraper 80.

Referring to FIGS. 2-3, the scraper 80 is positioned on the outlet side 72 of the nip 68, adjacent to the first spool roller 56. The scraper 80 is configured for guiding the wrap material 54 away from the circumferential exterior surface of the first spool roller 56. Referring to FIGS. 3-6, the scraper 80 includes a body 82. The body 82 extends along a longitudinal axis 84 in a generally parallel relationship relative to the first spool roller 56. As such, the body 82 of the scraper 80 extends generally across a width of the baler implement 20, on a generally horizontal plane and generally perpendicular to the central longitudinal axis 40 of the frame 22.

The body 82 includes a mounting portion 86 and a panel 88. The mounting portion 86 is configured for attachment to a structural component of the baler implement 20. The mounting portion 86 supports the panel 88 in a position relative to the first spool roller 56. The mounting portion 86 may include any structural shape suitable to mount the scraper 80 to the baler implement 20. As shown in the Figures, the example implementation of the mounting portion 86 of the scraper 80 is configured as a generally planar sheet portion that is secured to the baler implement 20 by one or more fasteners, e.g., bolts or other similar devices.

However, it should be appreciated that the mounting portion 86 of the scraper 80 may differ from the example implementation shown in the Figures and may be attached and/or secured to the baler implement 20 using some other attaching process, such as welding or some other mechanical fastening system.

The panel 88 extends from the mounting portion 86 of the scraper 80 to a distal edge of the panel 88. The panel 88 is formed from a generally thin, planar structure. The distal edge of the panel 88 may be cantilevered from the mounting portion 86 of the scraper 80. The panel 88 extends in a generally parallel relationship relative to the first spool roller 56. The panel 88 may include and/or be manufactured from a resilient material. The resilient material may include a material that enables the panel 88 to flex or bend away from an original or initial shape, and then return back to that original or initial shape. For example, the resilient material may include, but is not limited to, one of a metal such as but not limited to a steel material, or a spring steel material, or a plastic/polymer material.

Figure 6:
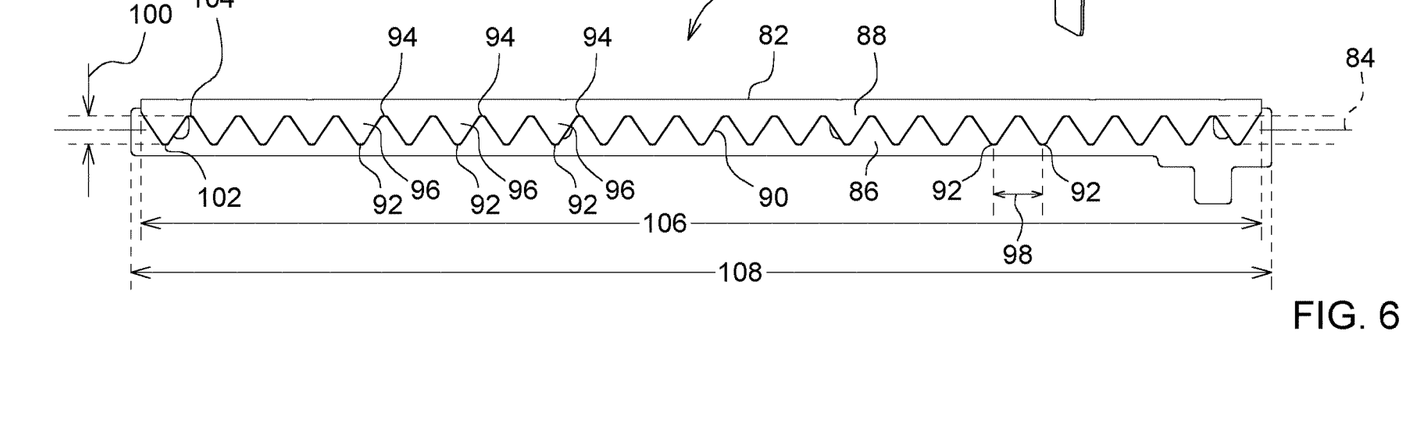
FIG. 6 is a schematic plan view of the scraper.

As best shown in FIG. 6, the distal edge of the panel 88 includes and/or defines an undulating edge 90 of the scraper 80. The undulating edge 90 of the scraper 80 includes a plurality of peaks 92 and a plurality of valleys 94 cooperating to define a plurality of fingers 96. The peaks 92 and the valleys 94 of the undulating edge 90 may be arranged in an alternating sequence in which each one of the valleys 94 is disposed between a respective pair of adjacent peaks 92. Each respective one of the peaks 92 and the valleys 94 may include a transitional shape disposed at their respective vertices. The transitional shape may include, but are not limited to, a generally rounded shape, such as shown in the figures, or a sharper more crisply defined pointed intersection, e.g., a V-shape. It should be appreciated that the peaks 92 and the valleys 94 may include some other transitional shape other than that shown in the Figures or described herein.

Each respective pair of the adjacent peaks 92 define a peak-to-peak distance 98 therebetween. The peak-to-peak distance 98 may vary between different pairs of the peaks 92. In other implementations, the peak-to-peak distance 98 may be substantially identical between different pairs of the peaks 92. In one implementation, the peak-to-peak distance 98 may be between the range of five millimeters (5 mm) and two hundred millimeters (200 mm), and more particularly between the range of ten millimeters (10 mm) and one hundred millimeters (100 mm). However, it should be appreciated that the peak-to-peak distance 98 may vary from the example range described herein.

The undulating edge 90 of the scraper 80 further includes and/or defines a finger depth 100. The finger depth 100 is the perpendicular distance measured between an apex 102 of a respective one of the peaks 92, i.e., fingers 96, and a root 104 of an adjacent valley 94. In one implementation, the finger depth 100 for each respective one of the fingers 96 may differ. In other implementations, the finger depth 100 for each respective one of the fingers 96 may be substantially identical. In one implementation, the finger depth 100 for each finger 96 may be between the range of two millimeters (2 mm) and one hundred millimeters (100 mm). In one example implementation, the finger depth 100 for each finger 96 is at least equal to or greater than approximately 3 mm. However, it should be appreciated that the finger depth 100 may vary from the example range described herein.

Referring to FIG. 6, the undulating edge 90 of the scraper 80 extends along the first spool roller 56 and includes an edge length 106. The edge length 106 may be defined as the length of the undulating edge 90 measured along the axis of rotation 60 of the first spool roller 56. In one implementation, the edge length 106 may be equal to or greater than one half a roller length 108 of the first spool roller 56. The roller length 108 may be defined as the length of the first spool roller 56 measured along the axis of rotation 60 of the first spool roller 56. As such, in one implementation, the edge length 106 of the scraper 80 may be greater than one half the roller length 108 of the first spool roller 56. In one implementation, the edge length 106 of the scraper 80 may be substantially equal to the roller length 108 of the first spool roller 56. However, it should be appreciated that in other embodiments, the edge length 106 of the scraper 80 may be less than one half of the roller length 108 of the first spool roller 56.

Referring to FIG. 3, the panel 88 positions the undulating edge 90 of the scraper 80 relative to the first spool roller 56 such that the plurality of peaks 92 are positioned proximate to the circumferential exterior surface of the first spool roller 56. In one implementation, the panel 88 may be arranged to present the plurality of peaks 92 of the undulating edge 90 in a generally tangential relationship relative to the circumferential exterior surface of the first spool roller 56. In another implementation, the panel 88 may be arranged to position the plurality of peaks 92 of the undulating edge 90 a separation distance 110 measured from the tangent line 78 passing through the nip 68 between the first spool roller 56 and the second spool roller 58. The separation distance 110 may be equal to or greater than five millimeters (5 mm). In one particular implementation, the separation distance 110 is approximately equal to fifteen millimeters (15 mm). However, it should be appreciated that the separation distance 110 may vary from the example values described herein.

It should be appreciated that the panel 88 may position the undulating edge 90 of the scraper 80 such that the peaks 92 of the undulating edge 90 are both spaced from the tangent line 78 of the nip 68 at the desired separation distance 110 and with the peaks 92 positioned in a generally tangential relationship relative to the exterior circumferential surface 64 of the first spool roller 56. It should be appreciated that changing the separation distance 110 may affect the angular relationship between the undulating edge 90 and the exterior circumferential surface 64 of the first spool roller 56. As such, changes to the separation distance 110 may require a corresponding change to the angular position of the panel 88 relative to the exterior circumferential surface 64 of the first spool roller 56 to maintain the generally tangential relationship therebetween.

In one implementation, the panel 88 may be arranged to position the plurality of peaks 92 of the undulating edge 90 a first orthogonal distance 112 measured from the circumferential exterior surface of the first spool roller 56. The first orthogonal distance 112 may be between the range of one millimeter (1.0 mm) and eight millimeters (8.0 mm). However, it should be appreciated that the value of the first orthogonal distance 112 may vary from the example range provided herein. The panel 88 may be arranged to position the plurality of valleys 94 of the undulating edge 90 a second orthogonal distance 114 from the circumferential exterior surface of the first spool roller 56. In some implementations, the first orthogonal distance 112 may be less than the second orthogonal distance 114.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:
a baling system defining a baling chamber having an inlet into the baling chamber, wherein the baling system is operable to receive crop material into the baling chamber through the inlet and form the crop material into a bale within the baling chamber;
a wrap system operable to insert a wrap material through the inlet and into the baling chamber to wrap the bale, the wrap system including:
a first spool roller and a second spool roller arranged in parallel and positioned to form a nip therebetween, wherein the first spool roller and the second spool roller are configured to receive the wrap material from a supply roll through an entrance side of the nip and discharge the wrap material toward the inlet of the baling chamber through an outlet side of the nip;
a scraper positioned on the outlet side of the nip adjacent to the first spool roller for guiding the wrap material away from a circumferential exterior surface of the first spool roller; and
wherein the scraper includes an undulating edge defining a plurality of peaks and a plurality of valleys with the plurality of peaks positioned proximate to the circumferential exterior surface of the first spool roller.

2. The baler implement set forth in claim 1, wherein the scraper includes a panel extending parallel with the first spool roller and defining the undulating edge of the scraper.

3. The baler implement set forth in claim 2, wherein the panel is arranged to position the plurality of peaks of the undulating edge a separation distance measured from a tangent line passing through the nip between the first spool roller and the second spool roller.

4. The baler implement set forth in claim 3, wherein the separation distance is equal to or greater than ten millimeters.

5. The baler implement set forth in claim 2, wherein the panel is arranged to position the plurality of peaks of the undulating edge a first orthogonal distance from the circumferential exterior surface of the first spool roller.

6. The baler implement set forth in claim 5, wherein the panel is arranged to position the plurality of valleys of the undulating edge a second orthogonal distance from the circumferential exterior surface of the first spool roller, wherein the first orthogonal distance is less than the second orthogonal distance.

7. The baler implement set forth in claim 2, wherein the panel includes a resilient material.

8. The baler implement set forth in claim 7, wherein the resilient material is one of a steel or a plastic.

9. The baler implement set forth in claim 1, wherein the plurality of peaks and the plurality of valleys are arranged in an alternating sequence in which each one of the plurality of valleys is disposed between a respective pair of adjacent peaks of the plurality of peaks.

10. The baler implement set forth in claim 9, wherein each respective pair of the adjacent peaks define a peak-to-peak distance therebetween that is between the range of ten millimeters and one hundred millimeters.

11. The baler implement set forth in claim 1, wherein the undulating edge includes an edge length that is equal to or greater than one half a roller length of the first spool roller along a respective axis of rotation of the first spool roller.

12. The baler implement set forth in claim 11, wherein the edge length of the undulating edge is substantially equal to the roller length of the first spool roller.

13. The baler implement set forth in claim 1, wherein the first spool roller includes an elastic material forming the exterior circumferential surface thereof.

14. The baler implement set forth in claim 13, wherein the elastic material includes a rubber material.

15. The baler implement set forth in claim 1, wherein the first spool roller and the second spool roller are configured to rotate about respective axes of rotation in opposite rotational directions relative to each other.

16. The baler implement set forth in claim 1, wherein the undulating edge defines a finger depth measured perpendicularly relative to and between an apex of a respective one of the plurality of peaks and a root of a respective adjacent one of the plurality of valleys, wherein the finger depth is equal to or greater than three millimeters.

17. A wrap system for a baler implement, the wrap system comprising:
a first spool roller and a second spool roller arranged in parallel and positioned to form a nip therebetween, wherein the first spool roller and the second spool roller are configured to receive a wrap material from a supply roll through an entrance side of the nip and discharge the wrap material through an outlet side of the nip;
wherein the first spool roller includes an elastic material forming an exterior circumferential surface thereof;
a scraper positioned on the outlet side of the nip adjacent to the first spool roller for guiding the wrap material away from the circumferential exterior surface of the first spool roller; and
wherein the scraper includes an undulating edge defining a plurality of peaks and a plurality of valleys with the plurality of peaks positioned proximate to the circumferential exterior surface of the first spool roller.

18. The wrap system set forth in claim 17, wherein the undulating edge includes an edge length that is equal to or greater than one half a roller length of the first spool roller along a respective axis of rotation of the first spool roller.

19. The wrap system set forth in claim 17, wherein the panel is arranged to position the plurality of peaks of the undulating edge a separation distance measured from a tangent line passing through the nip between the first spool roller and the second spool roller.

20. The baler implement set forth in claim 17, wherein the undulating edge defines a finger depth measured perpendicularly relative to and between an apex of a respective one of the plurality of peaks and a root of a respective adjacent one of the plurality of valleys, wherein the finger depth is equal to or greater than three millimeters.

* * * * *